No. 755,769. Patented March 29, 1904.

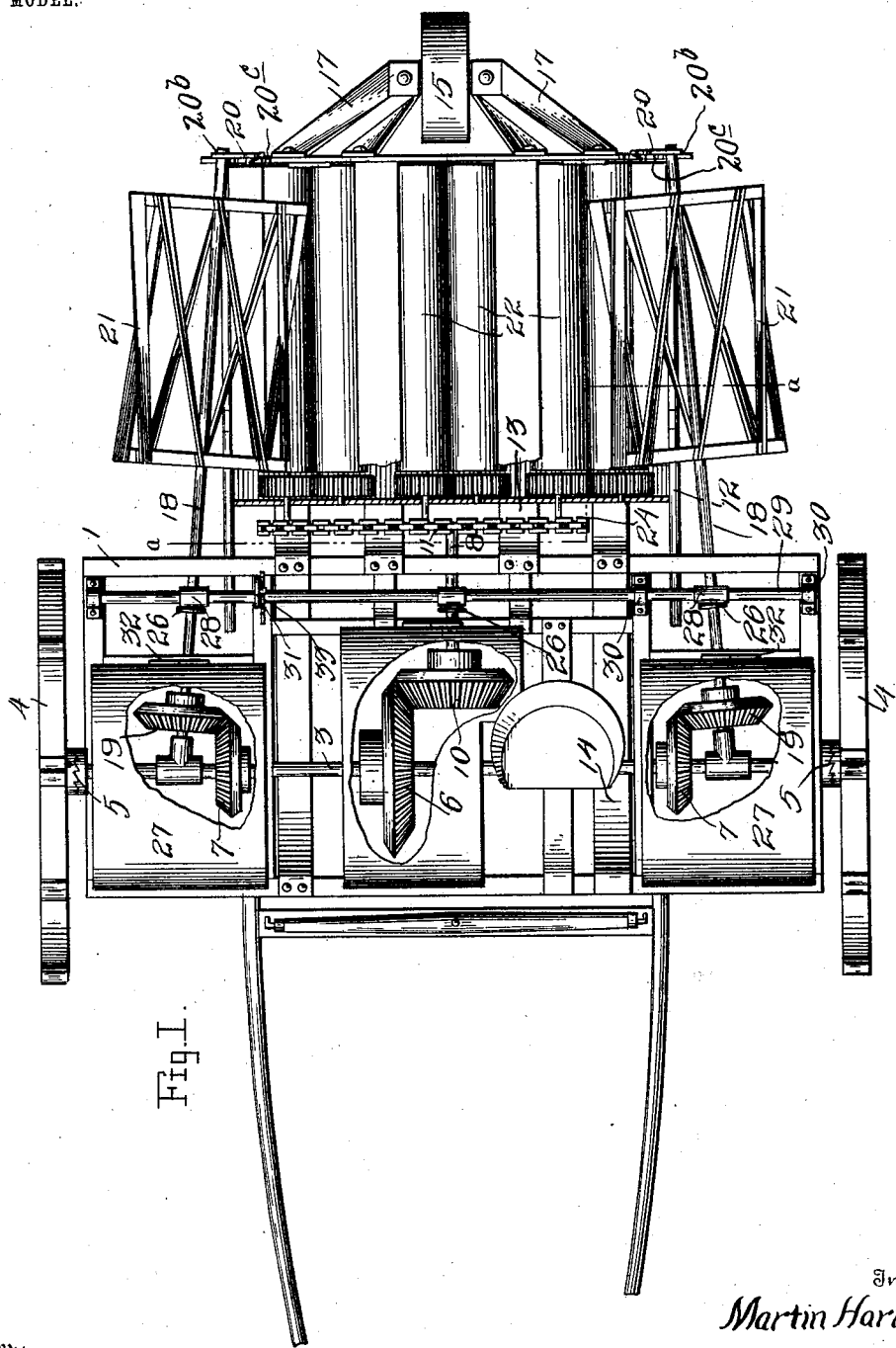

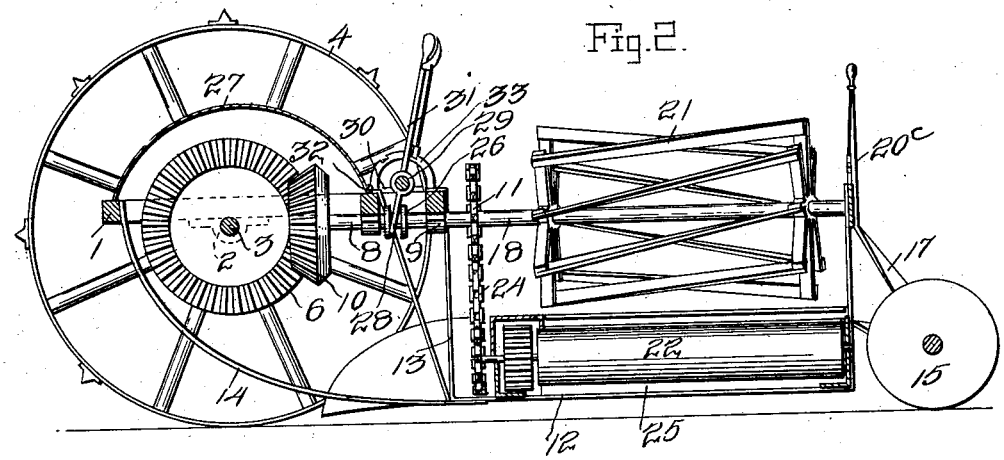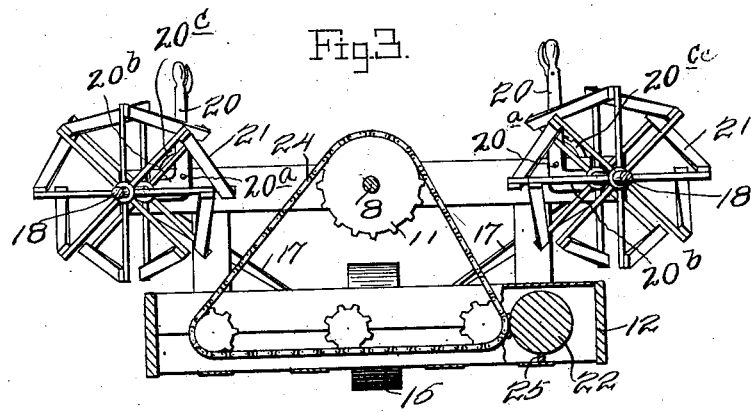

UNITED STATES PATENT OFFICE.

MARTIN HARMON, OF BLOOMINGTON, ILLINOIS.

POTATO-BUG MACHINE.

SPECIFICATION forming part of Letters Patent No. 755,769, dated March 29, 1904.

Application filed March 16, 1903. Serial No. 148,041. (No model.)

*To all whom it may concern:*

Be it known that I, MARTIN HARMON, a citizen of the United States, residing at Bloomington, in the county of McLean and State of Illinois, have invented certain new and useful Improvements in Potato-Bug Machines; and I do declare the following to be a full, clear, and exact description of the invention, such as will enable others skilled in the art to which it appertains to make and use the same.

My invention is an improved machine for knocking potato-bugs from the vines and destroying the same; and it consists in the peculiar construction and combination of devices hereinafter described and claimed.

The object of my invention is to provide a simple, cheap, durable, and efficient machine which is adapted to be driven astride the rows of potato-plants and to knock the potato-bugs from the vines and destroy the bugs while the machine is in motion.

In the accompanying drawings, Figure 1 is a top plan view of a potato-bug-destroying machine embodying my improvements. Fig. 2 is a longitudinal sectional view of the same. Fig. 3 is a vertical transverse view of the same, taken on the plane indicated by the line *a a* of Fig. 1.

In the embodiment of my invention here shown I provide the rectangular frame 1, having bearings 2 for an axle-shaft 3. On the latter, at the ends thereof, are traction-wheels 4, which are loose thereon and connected thereto by pawl-and-ratchet mechanisms 5 of the usual construction, which enable the machine to be readily turned and also enable it to be backed when the same is necessary without actuating the bug-destroying mechanism. Near the center of the axle-shaft is a beveled gear 6, and at suitable distances from the ends of the axle-shaft are miter-gears 7. A longitudinally-disposed shaft 8 is journaled in bearings 9 in the rear side and center of the frame 1 and is provided at its front end with a beveled gear 10, which engages the gear 6, and is provided at its rear end with a sprocket-wheel 11.

A frame 12 is disposed behind the central portion of the frame 1 and connected thereto by hangers 13 and draw-bars 14, the latter extending to the front cross-bar of the frame 1. At the rear side of the said frame 12 is a trail-wheel 15, the axle of which is journaled in bearings carried by a pair of rearwardly-extending brackets. Said brackets are connected to the rear side of the frame 12 by braces 17.

A pair of rearwardly-converging shafts 18 are journaled in suitable bearings, with which the frame 1 and levers 20, hereinafter described, are provided, and said shafts are provided at their front ends with miter-gears 19, which engage the gears 7. Hence when the machine is being drawn forward said shafts 18 are revolved. Any suitable means may within the scope of my invention be employed for adjusting the said shafts vertically. I show levers 20 for this purpose. I do not limit myself in this particular. Said levers 20 are bell-crank levers, fulcrumed as at $20^a$, and their arms $20^b$ having bearings for the rear ends of the shafts 18. Segment-racks $20^c$ and locking-dogs of the usual construction, with which the levers 20 are provided, secure the levers, and hence the rear ends of the beater-shafts 18, at any desired adjustment. Each of these shafts 18 carries a beater 21, preferably such as here shown. The said beaters are disposed at appropriate height to operate upon the vines as the machine passes them and by their rotation to so agitate the vines as to shake the bugs therefrom and to sweep the bugs inwardly, so that they are caused to fall upon the frame 12, which is between and below the said beaters. Within the scope of my invention any suitable means may be employed and carried in the said frame to receive the bugs and enable them to be destroyed *en masse*. I here show rollers 22 to destroy the bugs as they fall from the beaters, the said rollers being journaled in suitable bearings, with which the frame 12 is provided, and having sprocket-wheels at their front ends engaged by a sprocket-chain 24, which chain also engages and is driven by the sprocket-wheel 11. The said rollers are so closely related and driven in such directions as to cause them to draw the bugs between them and crush and destroy the bugs, as will be understood. Under each of the said rollers is a scraper 25 for removing the crushed bugs from the rollers.

Each of the shafts 8 18 is longitudinal in its bearings and is provided with a fixed clutch member 26. The latter are engaged by forked rock-arms 28 of a rock-shaft 29, which is journaled in suitable bearings 30 on the rear portion of frame 1 and is operated manually by a lever 31, with which the said rock-shaft is provided. A locking-dog of the usual construction is carried by the said lever and coacts with a segment-bar 33 to lock the rock-shaft at any desired adjustment. It will be understood that by means of this mechanism the shafts 8 18 may be moved to engage or disengage their gear-wheels with those carried by the driven or axle shaft, and hence the machine may be put in or out of operation by the driver at will. The gears are covered by housings 27, which are hinged at their rear sides, as at 32. Shafts or a draft-pole may be attached to the front end of the machine. A seat 34 for the driver is carried by the frame 1.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

What I claim is—

A bug-destroying machine having a front frame provided with an axle-shaft and supporting-wheels and gears 6, 7, thereon, a rear frame having intergeared crushing-rollers, certain of said rollers having driving sprocket-wheels, a longitudinal shaft 8, having its bearings in the front frame, provided at its front end with a gear 10 engaging the gear 6 and having at its rear end a sprocket-wheel 11, an endless sprocket-chain connecting said sprocket-wheel and the driving sprocket-wheels of the crushing-rollers, beaters above the crushing-rollers having the front ends of their shafts journaled in bearings on the axle-shaft, and provided with gears 19 engaging the gears 7, and bell-crank levers, carried by the rear frame and having bearings for the rear ends of the beater-shafts, substantially as described.

In testimony whereof I have hereunto set my hand in presence of two subscribing witnesses.

MARTIN HARMON.

Witnesses:
AURELIUS M. MILLER,
L. BRYAN CARLOCK.